July 15, 1941.  J. F. DAY  2,249,375
VEHICLE SIGNAL CONTROL DEVICE
Filed Oct. 4, 1939  2 Sheets-Sheet 1
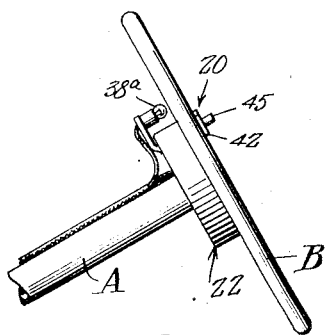
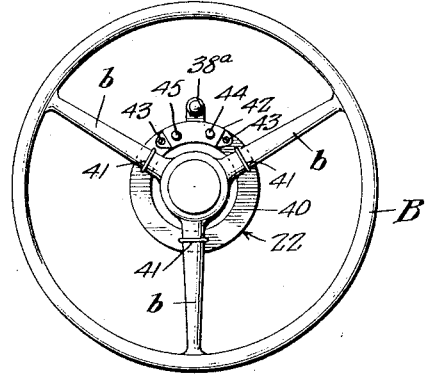
Joseph F. Day, INVENTOR July 15, 1941.  J. F. DAY  2,249,375
VEHICLE SIGNAL CONTROL DEVICE
Filed Oct. 4, 1939  2 Sheets-Sheet 2
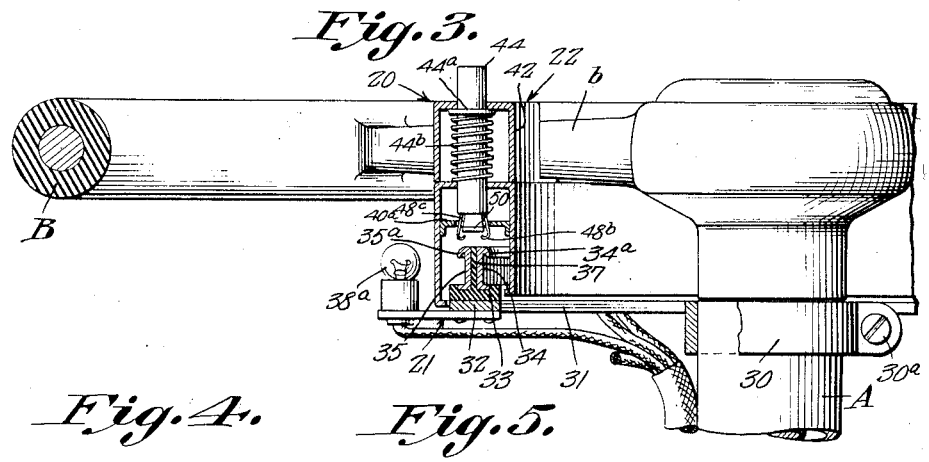
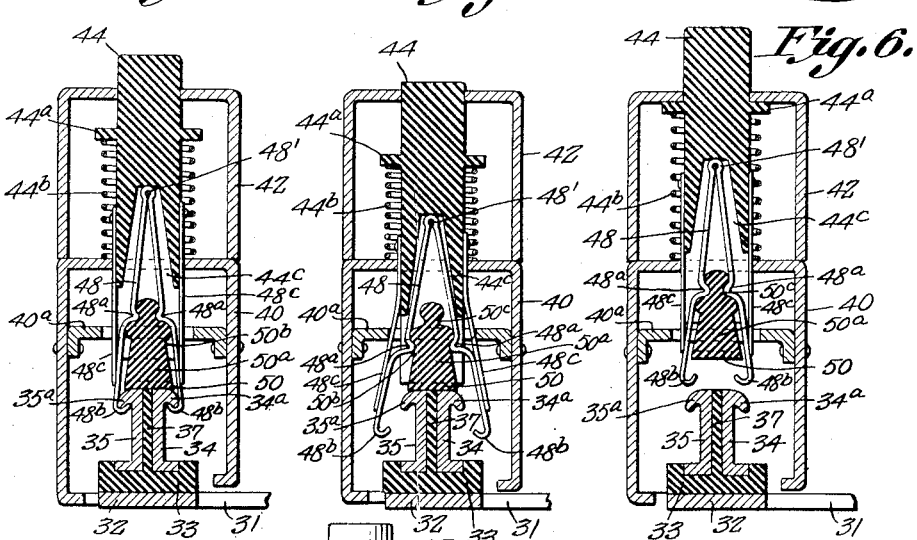
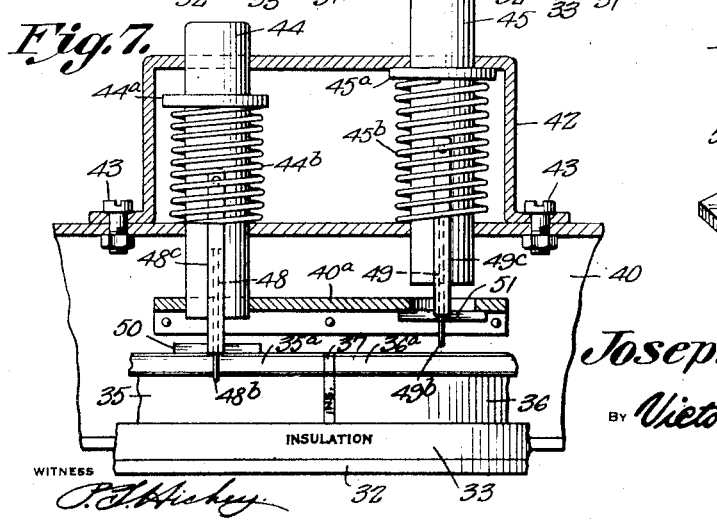
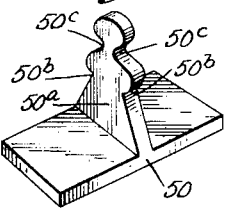
Joseph F. Day, INVENTOR
BY Victor J. Evans & Co.
ATTORNEYS Patented July 15, 1941

2,249,375

UNITED STATES PATENT OFFICE 2,249,375

VEHICLE SIGNAL CONTROL DEVICE

Joseph F. Day, Royal Oak, Mich.

Application October 4, 1939, Serial No. 297,944

2 Claims. (Cl. 200—59)

This invention relates to improvements in vehicle signalling devices and it is especially concerned with a new and improved type of vehicle signalling device suited for indicating proposed changes of direction of travel of the vehicle.

It is an object of the present invention to provide a signal of the above indicated type wherein means are included for causing resetting of the signal to non-operating position after the proposed change in direction of travel of the vehicle has been made.

Another object of this invention is to provide a novel signalling system for vehicles which can easily be mounted upon parts of the steering column and steering wheel in a locality suiting the same to convenient operation by the driver of the vehicle.

Another object of this invention is to provide a novel push button control for a vehicle signalling device including means for returning the control to rest position after the transaction indicated by the signal has been completed and also including means for resetting the signal without completing the indicated transaction.

An advantage of the novel signalling system according to the present invention over other types of signalling systems now in use is that it can be readily fitted upon existing types of vehicles without structural modification of parts of the vehicle and without requiring the use of special tools or apparatus.

A feature of the signalling system according to this invention is the comparative structural simplicity of its physical embodiments which facilitates manufacture of the signalling system under conditions of mass production and which also minimizes both the necessity and the likelihood of repair during conditions of ordinary use.

Other objects, advantages and features of the new and improved signalling system according to the present invention will be apparent to those skilled in this art during the course of the following description.

Regarded in certain of its broader aspects the novel signalling system according to the present invention comprises a stationary first set of switch elements mounted upon an automobile steering column; a moving second set of switch elements mounted on the steering wheel engaging with and connecting the first set of switch elements by moving into disengaged position when the steering wheel is rotated; and signalling means operated by connection of said first set of switch elements.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring them to the drawings:

Figure 1 is substantially a side elevational view of the upper part of a conventional vehicle steering column and steering wheel with the presently preferred embodiment of this invention illustrated mounted thereon;

Fig. 2 is essentially a top plan view of the structure illustrated in Fig. 1;

Fig. 3 is a substantially vertical sectional view of the structure illustrated in Fig. 1 displaying interior parts of the signal control mechanism;

Figs. 4, 5 and 6 are vertical cross-sectional views of the push button signal control according to this invention showing same with the elements arranged in several positions assumed during operation;

Fig. 7 is a vertical sectional view of the signal control mechanism;

Fig. 8 is a plan view of a segmental track forming part of the signal control according to the present invention;

Fig. 9 is a bottom view of the movable switch elements forming part of the signal control according to this invention showing the same mounted upon parts of a conventional vehicle steering wheel;

Fig. 10 is a perspective view of one of the T-shaped plugs forming a part of the push button signal control system; and Fig. 11 is a circuit diagram indicating the preferred mode of connecting the parts of the signaling system according to this invention.

Referring now to the drawings it will be observed that the novel signalling control system according to the present invention generally designated by the numeral 20 comprises a relatively stationary structure generally designated by the numeral 21 mounted upon the steering column A and a relatively movable assembly generally designated by the numeral 22 mounted upon the spokes b of the steering wheel B.

The stationary assembly 21, as will be seen in Figs. 3, 4, 7 and 8, comprises a compression collar 30 mounted on the steering column by the compression belt 30a and carrying radially extending arms 31 terminating in a segmental plate 32 positioned concentric the axis of the steering column A. A segmental shoe 33 formed of electrically insulative material conforming in shape and size to the segmental plate 32 is mounted thereon by appropriate fastening means and receives in the trough thereof the stationary switch elements 34, 35 and 36. It is to be noted that the switch element 34 extends substantially continuously throughout the length of the shoe 33 whereas the switch elements 35 and 36 separated from the switch element 34 by the band of insulation 37 are insulated from each other and each is of a length less than the length of the switch element 34. The top portions of the switch elements 34, 35 and 36 are extended outwardly to provide flanges 34a, 35a and 36a respectively for purposes which hereinafter more fully will be apparent. A radially extending arm mounted on the bottom of the segmental plate 32 carries a pilot lamp 38a which is connected to the switch element 34 and through a flasher 38b and fuse 38c to a battery 39. The connection of the other switch elements will be hereinafter described.

The mobile portions of the signal control mechanism will now be described, reference being made especially to Figs. 2, 3, 4, 7 and 9 wherein it will be seen that the mobile assembly comprises an essentially hollow annular casing 40 open at the bottom mounted upon the spokes b of the steering wheel B by appropriate fastening means 41 whereby the casing receives, overlies and conceals the shoe 33 and the switch elements 34, 35 and 36 irrespective of rotation of the steering wheel.

A box-like casing element 42 mounted upon the casing 40 by bolts 43 and positioned between spokes of the steering wheel is provided with openings formed in the top thereof registerable with openings formed in the top of the casing 40 whereby freely vertically sliding push buttons 44 and 45 can be mounted therein. The push buttons are provided with shoulders 44a and 45a respectively against which press springs 44b and 45b respectively which urge the push buttons upwardly within the casing 42 whereby the shoulders 44a and 45a engage with parts of the casing, thereby limiting movement of the buttons. Referring now especially to Figs. 4, 5 and 6 wherein details of the structure of the button 44 best are illustrated, it being understood that the button 45 is of similar structure and is provided with similar cooperating elements, it will be seen that a vertically extending slot 44c is formed in the bottom portion of the button 44 to receive an inverted V-shaped switch element 48 mounted upon a pin 48' passing through parts of the button and engaging with the apex of said switch element. The sides of the switch element 48, which are formed of intrinsically resilient material, are bent inwardly at an intermediate locality designated by the reference character 48a for purposes which hereinafter more clearly will be apparent and the free ends of the switch element are bent inwardly and upwardly to facilitate gripping by the switch element of the flanged top portions of the switch elements 34, 35 and 36 hereinabove described. Auxiliary spring pressing means 48c mounted upon side portions of the button 44 bear against the sides of the switch element 48 urging the end portions 48b thereof toward each other.

As will be apparent from Fig. 4, when the button 44 is pushed downwardly against the pressing action of the spring 44b, the end portions 48b of the switch element 48 position themselves around and establish electrical contact between the switch elements 34 and 35 being pressed thereagainst by the intrinsically resilient qualities of the element 48 and also the spring pressing members 48c.

A plug 50 T-shaped in cross sectional outline having an upstanding midportion 50a provided with detents 50b and 50c in the tapering sides thereof is positioned between the arms of the switch element 48 whereby, when the bottom portion of the plug 50 rests upon the tops of the switch elements 34 and 35 as shown in Fig. 4, the inwardly extending formations 48a in the sides of the switch element are received in and engage with the detent 50c of the plug. When a button is pushed further downwardly as shown in Fig. 5, the inwardly extending formations 48a on the sides of the switch element 48 move over the shoulder between the detents 50c and 50b and rest in the last mentioned, thereby causing operation of the arms of the member 48 to release the end portions 48b thereof from the flanged tops 34a and 35a of the switch elements 34 and 35. Action of the spring pressing means 44b acting against the shoulder 44a of the button 44 returns the parts to the rest position illustrated in Fig. 6 wherein it will be noted the inwardly extending formations 48a of the member 48 repose in the detents 50c having moved from the detents 50b by reason of engagement of laterally extending portions of the plug 50 with the partition element 40a as is well illustrated in Fig. 7, which shows the plug 51, corresponding to the plug 50, resting against the bottom surface of the partition element. It further will be noted in referring to Fig. 7 that the inverted V-shaped switch element 49b thereof corresponding to the switch element 48b of the push button 44 is spring urged by the members 49c to press the ends of the switch element toward each other in a manner hereinabove described in connection with the other inverted V-shaped switch element.

Referring now to the circuit diagram in Fig. 11, it will be evident, as above mentioned, that the essentially continuous segmental switch element 34 is connected to the battery 39 through the pilot lamp 38a, flasher 38b and fuse 38c. When connection is established between the switch element 34 and either the switch element 35 or 36, as for example by the switch element 48 which connects the switch elements 34 and 35, circuit is completed between the batteries and signal lamps 52 and 53 causing said lamps to be lighted displaying a signal indicating, in the preferred embodiment of this invention, an intended change in the direction of travel of the vehicle. In like manner connection between the switch element 34 and the switch element 36 will cause lighting of the signal lamps 54 and 55 indicating an intended change of direction of travel of the vehicle, preferably opposite to that indicated by the signal lamps 52 and 53. A manual switch 56 is provided for dash board operation of the signalling system if, upon occasion, the same is preferable to the push button control 60.

It is believed that it will be evident from the above description that when the driver of the vehicle contemplates changing the direction of travel of the vehicle he may depress one of the buttons 44 and 45 depending upon whether the intended change in the direction of travel is a turn to the right or to the left and by so doing, connection is established between a switch element 34 and one of the switch elements 35 and 36 as the case may be whereby the signal lamps 52 and 53 function as above described. As the steering wheel is rotated to effectuate the driver's intention, the connecting switch element carried by the depressed push button will ride along the segmental track provided by the flanged tops of the switch elements 34 and 35 or 36 as the case may be until such time as the end of the track is reached, whereupon the push button will be returned to its normal position as illustrated in Fig. 6 by action of the spring sleeved around the button. In the event that a driver has depressed a button and thereafter elects not to complete the transaction indicated by the signals, he may extinguish the lamps operated by the push button merely by depressing the button further to occupy substantially the position illustrated in Fig. 5 whereby the return of the push button to normal position as illustrated in Fig. 6 by action of the spring sleeved around the button is permitted.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. An automobile switch comprising a stationary first set of switch elements comprising a first continuous segmental contact element suited for coaxial mounting on an automobile steering column, a discontinuous series of second segmental contact elements, radially spaced from and coaxially mounted adjacent said first element but electrically insulated therefrom and from each other, said first set of switch elements being outwardly flared at the tops thereof; a moving second set of switch elements mounted on the steering wheel engaging with and connecting the first set of switch elements but moving into disengaged position when the steering wheel is rotated for connecting said continuous segmental contact element with said discontinuous series of switch elements, said second set of switch elements comprising a series of buttons normally spring pressed in a direction away from said first set of switch elements, inverted V-shaped members formed of intrinsically resilient material, one mounted in each of said buttons, having inturned ends for gripping the outwardly flared tops of the first set of contact elements; and means for disengaging said members from said contact elements comprising a V-shaped plug slidable within each of said members for spreading same, said plug having projecting formations coacting with adjacent parts causing counter movement of said plug permitting return of the V-shaped members to normal condition.

2. An automobile switch, comprising an arm adapted to be secured to the steering column of an automobile steering wheel, a segmental contact element carried by the arm below the steering wheel, two segmental contact elements parallel with the first mentioned segmental element and insulated therefrom, said segmental contact elements having outwardly and downwardly flared upper ends, a housing secured to the steering wheel and enclosing the said segmental contact elements, a push button mounted in the housing and normally upwardly spring held, spring contact arms having hooked ends adapted to engage the downwardly flared upper ends of the segmental contact elements and hold the push button in its downward position, and means for moving said spring hooked contact arm out of engagement with the downwardly flared upper ends of the segmental contact elements when the button is pushed a greater distance downwardly for opening the circuit, whereby the contact arms ride beyond the flared upper ends of the segmental contact elements and the push button returns to its normal upward position after the steering wheel had turned a predetermined distance.

JOSEPH F. DAY.